United States Patent [19]

Goel

[11] Patent Number: 4,639,505

[45] Date of Patent: Jan. 27, 1987

[54] POLY (ETHER AMIDE) COMPOSITION FROM REACTION OF BIS BICYCLIC AMIDE ACETAL WITH BIS- OR POLY-PHENOLIC MATERIAL

[75] Inventor: Anil B. Goel, Worthington, Ohio

[73] Assignee: Ashland Oil, Inc., Ashland, Ky.

[21] Appl. No.: 763,106

[22] Filed: Aug. 7, 1985

[51] Int. Cl.$^4$ .............................................. C08G 67/00
[52] U.S. Cl. ................................... 528/211; 528/153; 528/155; 528/163; 528/219
[58] Field of Search ............... 528/211, 163, 219, 153, 528/155

[56] References Cited

U.S. PATENT DOCUMENTS 3,737,408  6/1973  Hunsucker .......................... 528/211
4,539,376  9/1985  Goel et al. .......................... 525/375

Primary Examiner—Harold D. Anderson
Attorney, Agent, or Firm—John F. Jones

[57] ABSTRACT

The process for preparing novel polymers containing ether-amide groups by reaction of a bis- or poly-bicyclic amide acetal with a bis-phenolic or poly-phenolic material at a temperature of from about 80° C. to 200° C. is described.

5 Claims, No Drawings

POLY (ETHER AMIDE) COMPOSITION FROM REACTION OF BIS BICYCLIC AMIDE ACETAL WITH BIS- OR POLY-PHENOLIC MATERIAL

This invention relates to a process for preparing novel polymers containing ether-amide groups by the reaction of bis- or poly-bicyclic amide acetals with bis- or poly-phenolic materials.

Bicyclic amide acetals and some of their reactions have been described in a review article by R. Feinauer, SYNTHESIS, pp. 16–26, 1971. Although the Feinauer article describes the reaction of phenol with bicyclic amide acetal to give the monomeric hydroxyalkyl amido-ether compound via ring opening, no previous report of polymer formation by the reaction of bis-bicyclic amide acetals with bis- and poly-phenolic materials has been published.

I have discovered that thermoplastic and thermoset polymers can be prepared by the reactions of di- or poly-phenolic materials, respectively, with bis- or poly-bicyclic amide acetals. The process of this invention can also optionally include the use of additives such as polyepoxides, polyoxazolines, and the like in the polymerization reactions of bis- or poly-biclic amide acetals with phenolic materials. The polymers which result from the process of this invention have good thermal properties and are useful in applications such as in reinforced composites, adhesives, and the like.

The bis-bicyclic amide acetals useful in this invention include those of Formulas I and II

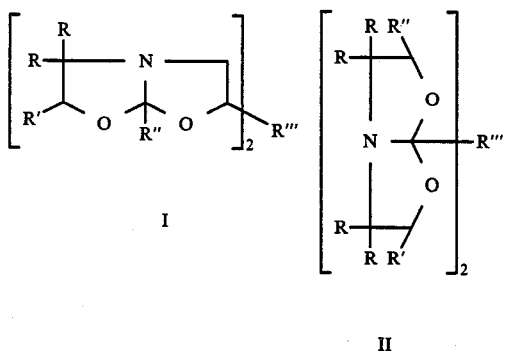

I

II wherein R, R' amd R" independently represent hydrogen, an alkyl group having from 1 to 20 carbon atoms, an aryl group having from 6 to 12 carbon atoms, an alkaryl group having from 7 to 20 carbon atoms and a hydrocarbon ether group having from 1 to 20 carbon atoms and R''' represents an alkylene group having from 1 to 20 carbon atoms, an arylene group having from 6 to 12 carbon atoms or an alkarylene group having from 7 to 20 carbon atoms.

The bis-phenol and poly-phenol materials useful in this invention include those having at least two aromatic hydroxyl groups per molecule including the various benzene and fused aromatic ring diols and triols, e.g., 1,4-benzene diol (hydroquinone), 1,3-benzene diol (resorcinol), 1,4-naphthalene diol and 1,3,5-benzene triol; the biphenyl diols, e.g., (1,1'-biphenyl)-2,2'-diol; the alkylene and cycloalkylene bisphenols, e.g., 2,2'-methylene bisphenol, 4,4'- (phenyl methylene) bisphenol, 4,4'-(cyclohexanediyl) bisphenol, 4,4'-(1,2-diethyl-1,2-ethenediyl) bis phenol, and 3,4-bis(4-hydroxy phenyl)-2,4-hexadiene; the arylene bisphenols, e.g., 4,4'-phenylene bisphenol; the oxy, thio and sulfonylbisphenols, e.g., 2,3-oxybisphenol, 4,4'-thiobisphenol and 2,2'-sulfonyl bisphenol; the bis(hydroxyaryl) alkanones, e.g., bis(4-hydroxyphenyl) methanone, 1,5-dihydroxy-9,10-anthracene dione and 4-[bis(4-hydroxyphenyl)methylene]-2,5-cyclohexadiene-1-one; the various benzamide and benzoate derivatives, e.g., 2-hydroxy-N-(4-hydroxy phenyl) benzamide, 4-hydroxy-4-hydroxy phenyl benzoate, 2-methyl-2-(4-hydroxy benzoyl) oxymethyl-1,3-propanediyl-4-hydroxy benzoate, bis-(4-hydroxy benzoate)-1,2-ethandiyl; 2-(4-hydroxy benzoate) ethyl ether, bis(4-hydroxy benzamide)-1,6-hexanediyl and bis (4-hydroxy benzamide) 1,4-benzenediyl.

The bis-phenol and poly-phenol materials can also contain substituents including alkyl, aryl, halo, cyano, nitro, alkoxy, aryloxy, alkyl sulfides, aryl sulfides, amine, alkyl or aryl amine, amide, ester and the like.

In addition to the phenolic materials noted above, a variety of oligomers containing a plurality of phenolic groups constitutes an important class of materials for this invention. Particularly representative of such oligomers are the base or acid catalyzed phenol and formaldehyde condensation products such as the novalaks. Besides the conventional resoles, the phenolic resins characterized in having benzylic ether linkages prepared by metal ion catalysis such as disclosed in U.S. Pat. No. 3,485,797 are applicable. Other suitable polyphenol oligomers include the addition polymers and copolymers of a vinyl substituted phenol such as 4-ethenyl phenol.

The process of this invention can be illustrated in the following equation:

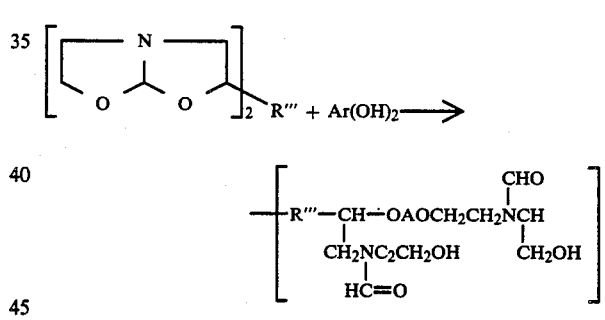

wherein R''' has the above designation and Ar represents an aromatic hydrocarbon diradical.

In the process of this invention, the bicyclic amide acetal functionality in relation to phenol functionality is considered to be 1:1. Thus, in the absence of other reactive additives, the equivalent ratio of bicyclic amide acetal to phenolic hydroxyl is 1:1 for high molecular weight polymer. However, it has been found that under high reaction temperature conditions, the thermoplastic polymer obtained in the 1:1 reaction of a bis-bicyclic amide acetal with a diphenol can be converted to a thermoset material. This may be caused by the hydroxyl groups remaining which may be involved in the cross-linking reaction. The amounts of additives (e.g. epoxides, oxazolines, etc.) to bis-bicyclic amide acetal used in the process of this invention can be in the range of 0:100 to 95:5% by weight. If an additive of this type is used the amounts of phenolics used in any one case are adjusted in order to keep the equivalents within the preferred range.

The process of this invention is preferably carried out in the absence of a solvent or diluent. The process is preferably carried out in the melt phase which usually constitutes the mode of choice in the preparation of matrix resins in the production of composites which represents a prime utility of the materials of this invention. In some cases it may be desirable to carry out the initial polymerization reaction in solution employing a high boiling aprotic solvent such as, for example, N,N-dimethylacetamide, N,N-dimethylformamide, 1-methyl-2-pyrrolidone, dimethyl sulfoxide, and the like. The polymerization product in such a case can then be isolated and curing completed in a subsequent molding operation.

The process of this invention is preferably carried out at a temperature in the range of from about 80 degrees C. to about 200 degrees C. at from about atmospheric pressure up to about 50 atmospheres.

This invention is further illustrated in the following representative examples.

EXAMPLE 1

A bis-bicyclic amide acetal was prepared in the following manner. In a 250 ml round bottom flask equipped with a magnetic stirring bar, a thermometer with a temperature controller, nitrogen inlet and a reflux condenser, 62.6 g of 2-ethyl-2-oxazoline and 46.4 g of 1,2,7,8-diepoxy octane were added. The reaction mixture was heated under a nitrogen atmosphere with constant stirring for about 47 hours during which time the reaction temperature was maintained between 140 and 170 degrees C. The GLC analysis of the mixture indicated the complete consumption of the 1,2,7,8-diepoxy octane. The mixture was then subjected to fractional distillation under reduced pressure which afforded approximately 52 g of the bis-bicyclic amide acetal of Formula I in which R and R' are hydrogen, R" is ethyl and R''' is $C_2H_4$. This product was found to boil at 160-170 degrees C./0.03 mm of Hg.

EXAMPLE 2

The bis-bicyclic amide acetal of Example 1 (3.4 g) and resorcinol (12.1 g) were mixed under nitrogen and heated at about 155 degrees C. for about 2 hours to give a thermoplastic polymer which was soluble in dimethyl formamide (DMF) and 1-methyl-2-pyrrolidone (NMP). The PMT (polymer melting temperature) was about 93-95 degrees C. and the infrared spectrum for this material showed the presence of strong bands at 3400 cm-1 (hydroxyl group) and 1625-35 cm-1 (amide group). By TGA (thermogravimetric analysis) 10% weight loss for the polymer in nitrogen occurred at 329 degrees C. The polymer upon further heating at 160 degrees C. for 2 hours became infusible. The Tg of DSC (Differential Scanning Calorimeter) was 44.6 degrees C. and 10% weight loss in nitrogen by TGA occurred at 356 degrees C.

EXAMPLE 3

The procedure of Example 2 was followed using 1.8 g of the bis-bicyclic amide acetal of Example 1 and 1.0 g of a polyphenolic resin obtained by phenol-formaldehyde condensation (Alnovol from American Hoechst) having an equivalent weight of 90-100. The thermoset polymer was obtained within two minutes of mixing the bis-bicyclic amide acetal and polyphenolic resin at 160 degrees C. The product after it had been postcured at 160 degrees C. for three hours was found to be insoluble in DMF and NMP. The Tg by DSC was 44.2 degrees C. and 10% weight loss in nitrogen by TGA occurred at 339 degrees C.

EXAMPLE 4

The procedure of Example 2 was followed using 0.9 g of the bis-bicyclic amide acetal, 1.9 g of liquid diglycidyl ether of Bisphenol-A (epoxy equivalent weight 185-195) and 1.5 g of the polyphenolic resin described in Example 3. A clear solution resulted within two minutes after mixing the ingredients and heating the mixture at 150 degrees C. and gellation occurred within five minutes. The resulting polymer was postcured at 160 degrees C. for about 2 hours. The Tg by DSC for this polymer was 104.2 degrees C. and 10% weight loss in nitrogen by TGA occurred at 406.3 degrees C.

EXAMPLE 5

The procedure of Example 2 was followed using 1.8 g of the bis-bicyclic amide acetal, 2.2 g of resorcinol and 3.24 g of the bis-oxazoline of isophthalic acid. The thermoplastic polymer obtained within five minutes of heating at 160 degrees C. was postcured at 160 degrees C. for three hours. The Tg by DSC was 75.4 degrees C. and 10% by weight loss in nitrogen by TGA occurred at 332 degrees C.

EXAMPLE 6

The procedure of Example 2 was followed using 0.45 g of the bis-bicyclic amide acetal, 2.25 g of the polyphenolic resin described in Example 3 and 2.2 g of isophthaloyl bis-oxazoline. The thermoset polymer obtained showed a decomposition temperature (TGA) of 368 degrees C.

EXAMPLE 7

The procedure of Example 2 was followed using 0.9 g of bis-bicyclic amide acetal, 2.5 g of the polyphenolic resin of Example 3, 1.9 g of liquid diglycidyl ether of Bisphenol-A and 1.1 g of isophthaloyl bis-oxazoline. The resulting mixture, upon heating at 150 degrees C., became a clear solution within two minutes and gelled within five minutes. The infusible polymer which resulted was found to have a Tg by DSC of 110 degrees C. and 10% weight loss occurred in nitrogen by TGA at 374 degrees C.

EXAMPLE 8

A mixture of bis-bicyclic amide acetal (1.8 g), the polyphenolic resin of Example 3 (2.0 g) and terephthaloyl bis-oxazoline (1.12 g) was heated at 200 degrees C. to give a gelled polymer within five minutes. The resulting polymer was postcured at 190-200 degrees C. for one hour to give an infusible polymer which was insoluble in DMF and NMP. The 10% weight loss in nitrogen by TGA for this polymer occurred at 380 degrees C.

EXAMPLE 9

The procedure of Example 1 was followed using 4.3 g of isophthaloyl bis-oxazoline and 7.6 g of liquid diglycidyl ether of bis-phenol-A and the mixture was heated under nitrogen for 2 hours at 155°-160° C. to give a viscous paste. This resulting material which is believed to be a poly-bicyclic amide acetal was mixed with 2.1 g of resorcinol and heated at 160° C. Gellation occurred within 15 minutes and the polymer was postcured at 160° C. for 2 hours. The resulting solid polymer was found to have a Tg of 139° C. and a 10% weight loss by thermogravimetric analysis (TGA) occurred in the polymer at 352° C.

EXAMPLE 10

This is a comparative example demonstrating that when the reactants of Example 9 are mixed at once (no bicyclic amide acetal present) and polymerized, the resulting polymer which is outside the scope of this invention has poor physical properties. The mixture of 4.3 g of isophthaloyl bis-oxazoline, 7.6 g of diglycidyl ether of bis-phenol-A and 2.1 g of resorcinol was heated at 160° C. for 4 hours to give a polymer which was found to have a Tg of 113.6° C. and had a 10% weight loss by TGA at 333° C.

I claim:

1. The process for preparing a polymer composition containing ether-amide groups comprising reacting a bis bicyclic amide acetal of Formula I or II

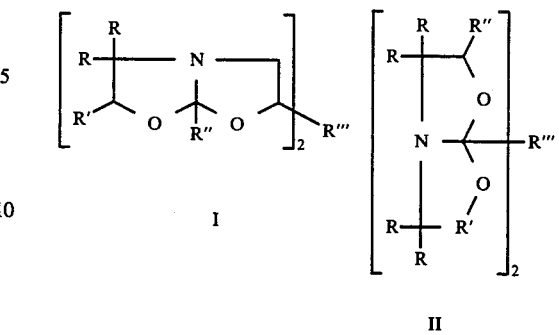

wherein R, R' and R" independently represent hydrogen, an alkyl group having from 1 to 20 carbon atoms, an aryl group having from 6 to 12 carbon atoms, an arkaryl group having from 7 to 20 carbon atoms or a hydrocarbon ether group having from 1 to 20 carbon atoms and R''' represents an alkylene group having from 1 to 20 carbon atoms, an arylene group having from 6 to 12 carbon atoms or an alkarylene group having from 7 to 20 carbon atoms, with a bis-phenolic or poly-phenolic compound at a temperature in the range of from about 80° C. to 200° C.

2. The process of claim 1 wherein the bis-phenolic or poly-phenolic compound has at least two aromatic hydroxyl groups per molecule.

3. The process of claim 2 wherein the bis-bicyclic amide acetal is one of Formula I wherein R and R' are hydrogen, R" is ethyl and R''' is $C_2H_4$ and the bis-phenolic material is resorcinol.

4. The process of claim 2 wherein the bis-bicyclic amide acetal is one of Formula I wherein R and R' are hydrogen, R" is ethyl and R''' is $C_2H_4$ and the poly-phenolic material is a phenol-formaldehyde condensation product.

5. The polymer composition produced by the process of claim 1.

* * * * *